(12) United States Patent
Befelein et al.

(10) Patent No.: US 7,703,960 B2
(45) Date of Patent: Apr. 27, 2010

(54) LIGHT FOR MOTOR VEHICLES

(75) Inventors: Carsten Befelein, Haar (DE); Martin Enders, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 12/029,161

(22) Filed: Feb. 11, 2008

(65) Prior Publication Data

US 2008/0165549 A1 Jul. 10, 2008

Related U.S. Application Data

(63) Continuation of application No. PCT/EP2006/007069, filed on Jul. 19, 2006.

(30) Foreign Application Priority Data

Aug. 12, 2005 (DE) .................. 10 2005 038 154

(51) Int. Cl.
*F21V 9/00* (2006.01)
(52) U.S. Cl. .................. 362/511; 362/551; 362/555; 362/559; 362/487
(58) Field of Classification Search .................. 362/511, 362/555, 559, 487, 498, 499
See application file for complete search history.

(56) References Cited

U.S. PATENT DOCUMENTS

| | | | |
|---|---|---|---|
| 6,565,244 B1 * | 5/2003 | Murphy et al. ............... 362/511 |
| 6,789,929 B1 | 9/2004 | Doong et al. | |
| 6,880,945 B2 | 4/2005 | Knaack et al. | |
| 6,926,432 B2 | 8/2005 | Rodriguez Barros et al. | |
| 7,188,981 B2 | 3/2007 | Rodriguez Barros et al. | |
| 2001/0048601 A1 | 12/2001 | Emmelmann et al. | |
| 2002/0149946 A1 | 10/2002 | Malone et al. | |
| 2003/0193815 A1 | 10/2003 | Mishimagi | |

(Continued)

FOREIGN PATENT DOCUMENTS

DE 198 04 440 A1 8/1999

(Continued)

OTHER PUBLICATIONS

International Search Report dated Oct. 6, 2006 with English translation (Six (6) Pages).

(Continued)

*Primary Examiner*—Anabel M Ton
(74) *Attorney, Agent, or Firm*—Crowell & Moring LLP

(57) ABSTRACT

A light for motor vehicles includes a rod-shaped optical waveguide having at least two optical waveguide arms arranged behind one another in their longitudinal direction, and between which at least one light source is arranged whose light can be coupled on a front side of the light into the optical waveguide arms and can be emitted transversely to their longitudinal direction by way of a light exit surface situated opposite a reflecting surface. In a central area between the optical waveguide arms, a row of more than two light sources is aligned in the longitudinal direction of the optical waveguide arrangement. The light of two outer light sources can be coupled into the respective front sides of the adjacent optical waveguide arms, and the light of at least one light source situated in-between the two outer light sources can be emitted directly in the direction of the light exit surface.

12 Claims, 1 Drawing Sheet

U.S. PATENT DOCUMENTS

2004/0012926 A1* 1/2004 Wanes et al. ................ 361/715
2005/0286262 A1 12/2005 Gasquet et al.

FOREIGN PATENT DOCUMENTS

| DE | 100 29 542 A1 | 12/2001 |
| DE | 101 29 950 A1 | 1/2003 |
| DE | 101 37 605 A1 | 2/2003 |
| DE | 102 00 359 A1 | 7/2003 |
| DE | 20 2004 016 669 U1 | 1/2005 |
| EP | 0 940 331 A1 | 9/1999 |
| EP | 1 304 260 B1 | 4/2003 |
| EP | 1 610 158 A1 | 12/2005 |

OTHER PUBLICATIONS

German Search Report dated May 9, 2006 with English translation of relevant portion (Nine (9) Pages).

* cited by examiner

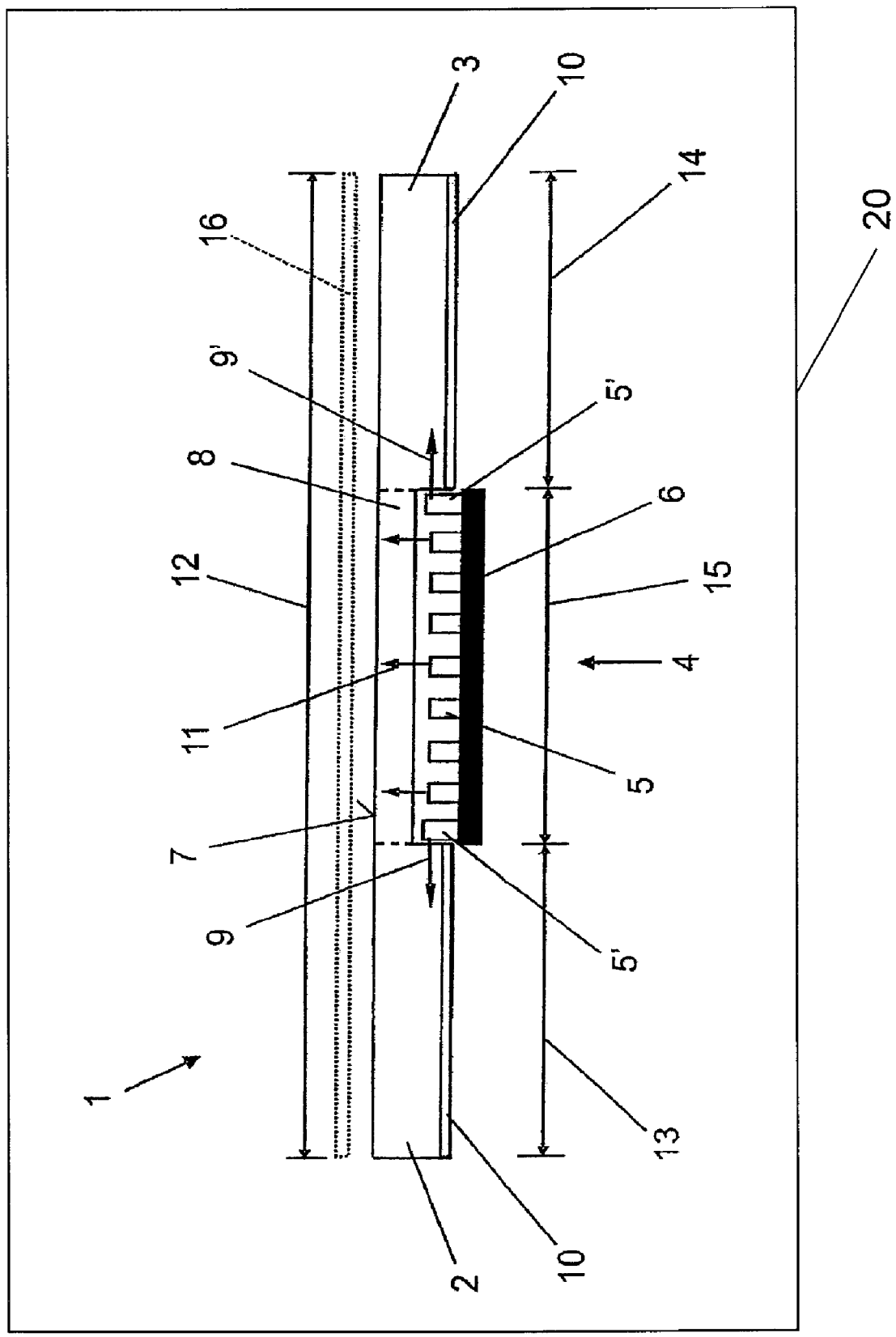

US 7,703,960 B2

LIGHT FOR MOTOR VEHICLES

CROSS-REFERENCE TO RELATED APPLICATIONS

This application is a continuation of PCT International Application No. PCT/EP2006/007069, filed Jul. 19, 2006, which claims priority under 35 U.S.C. §119 to German Patent Application No. 102005038154.5, filed Aug. 12, 2005, the entire disclosure of which is herein expressly incorporated by reference.

BACKGROUND AND SUMMARY OF THE INVENTION

The invention relates to a light for motor vehicles, particularly an additional brake light, comprising a rod-shaped optical waveguide arrangement. The optical waveguide arrangement includes at least two optical waveguide arms that are arranged behind one another in their longitudinal direction and between which at least one light source is arranged. The light from the light source can be coupled on the front side of the light into the optical waveguide arms and can be emitted transversely to their longitudinal direction by way of a light exit surface situated opposite a reflecting surface.

Lights for motor vehicles having rod-shaped optical waveguide arrangements can be used particularly for additional brake lights that are centrally arranged on the rearward structure or on a rear window. The brake lights are also called third brake lights or high-mounted brake lights, abbreviated HBL.

In the case of known high-mounted brake lights, as disclosed, for example, in German Patent Documents DE 198 04 440 A1 and DE 100 29 542 A1, one punctiform-emitting light source, preferably an LED, is arranged at the ends of a rod-shaped optical waveguide. The light source couples its light on the front side into the optical waveguide. On the circumference of the optical waveguide, a reflecting surface is arranged opposite the light exit surface. The reflecting surface has a plurality of prisms reflecting the incident light, whereby a uniform illumination of the radiating surface is then achieved at the light exit surface. As disclosed in German Patent Document DE 100 29 542 A1, the prism arrangement, in an operative connection with a correspondingly shaped light exit surface, can additionally take over the function of a reflector that reflects light incident on the brake light from the outside.

For achieving a uniform illumination along its entire length and for maintaining the legally required light values and light surfaces, such brake lights require LEDs with a relatively high luminous intensity. Particularly in the case of an internal mounting on the rear window and greater overall lengths (more than 50 cm) of the prism rod, the expenditures rise considerably.

German Patent Document DE 20 2004 016 669 U1 discloses a high-mounted brake light that has two rod-shaped optical waveguides arranged behind one another in the longitudinal direction. Between the waveguides, at least one, preferably two light sources are arranged that couple their light on the front side into the respectively adjacent optical waveguide. An opening for receiving a spraying nozzle of a rear-window washing system is provided between the optical waveguides. In addition, a cooling body is assigned to each optical waveguide that is in a thermal contact with a printed circuit board that carries the light source(s) of the respective optical waveguide.

The cooling bodies, which are provided for the cooling of the printed circuit boards and for the light sources, respectively, and whose construction expenditures and costs are relatively high, are disadvantageous in the case of the known brake light. In addition to the attendant construction expenditures and costs, the two printed circuit boards and two cooling bodies also require additional space and additional weight for the brake light. Furthermore, as a result of the construction, a gap in the brake light emission is created in a center part in the area of the spraying nozzle opening. This may have an unfavorable effect on the visual appearance of the light and is therefore more suitable only for special brake lights where such a recess is defined.

It is therefore an object of the present invention to create a light for motor vehicles having a rod-shaped optical waveguide arrangement, particularly for a use as a high-mounted brake light which, although it has a relatively long length, ensures a uniform illumination and which nevertheless is cost-effective and has a simple and space-saving construction.

This and other objects and advantages are achieved by the motor vehicle light according to the invention, which comprises a row of more than two light sources aligned in a central area between optical waveguide arms in the longitudinal direction of an optical waveguide arrangement that is arranged on an electronic carrier plate. The light of the two outer light sources can be coupled into the respective front sides of the adjacent optical waveguide arms, and the light of at least one light source situated in-between the two outer light sources can be directly emitted in a direction perpendicular to the light exit surface.

Using the arrangement according to the invention, it is advantageously achieved that, when cost-effective light sources and optical waveguides are used, a high-mounted brake light can be obtained which without any problem can extend to over the entire vehicle width and can be used for an external attachment as well as for an internal attachment to the rearward vehicle structure.

A direct emission starts out from the central area in the direction of the light exit surface. Laterally thereof, two optical waveguide arms are arranged that may be correspondingly shorter. For feeding the shorter optical waveguide arms, conventional light sources are sufficient to generate a sufficiently strong and homogenous illumination at the light exit surface, such as in the case of an internal attachment to the rear window. Conventional light sources require no special cooling measures, such as special cooling bodies or high-expenditure electronic controls. For the optical waveguide arms, commercially available optical waveguide bodies comprising prism rods can be used. On one longitudinal side, these have a reflecting surface formed by prism elements where the coupled-in light is reflected multiple times. As a result, a homogenous emission is generated into a preferred direction, i.e., in the direction of the light exit surface. The light exit surface situated opposite the prism surface may be constructed, for example, as a clear smooth surface, as far as the visual appearance is concerned. Natural, colored and/or structured surfaces are also conceivable. A corresponding covering pane may also be disposed in front of the light exit surface.

According to a preferred embodiment of the invention, an optical element may be disposed in front of the carrier plate in the direction of the light exit surface, such that the direct emission radiates through it. This optical system may be an optical waveguide whose optical characteristics are adapted to the lateral optical waveguide arms. As a result, an emission is achieved in a simple manner that appears particularly uniform over the entire length of the optical waveguide arrangement. The optical waveguide arms may be part of an optical waveguide that is correspondingly cut out or shaped in the central area of the carrier plate. Further additional secondary optical systems are conceivable. However, it is also conceivable that the carrier plate is covered by a covering pane arranged in the plane of the light exit surface or the cover of the optical waveguide arms without an additional optical element. As a result, a direct view of the emitting light sources is made possible in the case of a clear covering pane, which may be desirable for achieving certain visual effects.

Conventional light emitting diodes (LEDs) in the visible wavelength range are particularly suitable for use as light sources. These are cost-effectively available in any desired emission color (wavelength in the visible range), particularly in the red color spectrum, which is relevant to brake lights. In addition, they have a particularly long service life and can easily be bonded and wired as compact components on a printed circuit board, which is particularly suitable as the electronic carrier plate. A component manufactured by flexible printed circuit board technology may be provided as a printed circuit board, such as a base made of a polymer foil with a highly ductile copper deposit. As a result, the optical waveguide arrangement can be easily adapted to a defined geometry when mounted at the installation site.

In a further preferred embodiment of the invention, the outer light sources, i.e., those whose light is coupled into the optical waveguide arms, and the inner light sources i.e., those which emit directly, have different light intensities. By means of a suitable selection of the light intensities, a particularly homogeneous emission of the light can be achieved. In particular, it is possible to compensate losses that may occur during the front-side coupling-in as well as a higher luminance as a result of several directly emitting LEDs in the central emission range, particularly without high-expenditure electronic control devices.

According to another preferred embodiment of the invention, the optical waveguide arrangement is constructed in one piece. The electronic carrier plate may be constructed as a plastic insert such as an injection-molded part. As a result of the one-piece optical waveguide, a continuous smooth light exit surface can be used, which is particularly favorable visually. Furthermore, a compact component is obtained, which is especially mounting-friendly.

For the external attachment, a one-piece component is particularly suitable, because high-expenditure sealing can be saved. In a preferred one-piece component, the carrier plate is connected with the optical waveguide arms as an insert using, for example, a plastic injection-molding method. However, a particularly flexible optical waveguide arrangement may be provided in a modular design, where the individual modules (optical waveguide arms, carrier plate) can be mutually connected in a detachable manner by way of snap-in or plug-type connections. Such an arrangement can be cost-effectively adapted to different vehicle models.

The lengths of the optical waveguide arms as well as the central emission range defined by the carrier plate can be arbitrarily varied in order to achieve a desired emission surface or emission length as well as a desired emission characteristic. Here, it is also conceivable that, as provided in a further preferred embodiment of the invention, the optical waveguide arrangement can have three or more optical wave guide arms with carrier plates that are each arranged in-between. The waveguide arms are advantageously wired to one another and each carry a plurality of light sources such that the light of the respectively outer light sources can be coupled into the respectively adjacent faces of the corresponding optical waveguide arms. It thereby becomes possible to further increase the luminous power of the light when using cost-effective LEDs and therefore again expand the application possibilities of the light.

Other objects, advantages and novel features of the present invention will become apparent from the following detailed description of the invention when considered in conjunction with the accompanying drawings.

BRIEF DESCRIPTION OF THE DRAWING

The single FIGURE is a simplified longitudinal sectional view of a light according to the invention.

DETAILED DESCRIPTION OF THE DRAWING

A light for motor vehicles according to the invention comprises a rod-shaped optical waveguide 1 having two optical waveguide arms 2, 3 arranged behind one another in their longitudinal direction. Between the optical waveguide arms 2, 3, in a central area 4, a row of several light sources 5, 5' is arranged in the longitudinal direction of the optical waveguide arrangement 1 on an electronic carrier plate 6.

The FIGURE illustrates a light constructed as a high-mounted brake light having a length 12 that may extend over an entire vehicle width or rearward structure width of a vehicle 20 (shown schematically). The total length 12 is the sum of lengths 13, 14, 15 of the individual components 2, 3, 6.

The optical waveguide arms 2, 3 are constructed as rod-shaped optical waveguide bodies. Reflecting surfaces 10 which each have a plurality of prism elements and which reflect in a known manner, are constructed on the undersides of the waveguide bodies. The carrier plate 6 is situated between the optical waveguide arms 2, 3. This carrier plate 6 is advantageously constructed as a flexible printed circuit board on which the light sources 5, 5' are bonded. Preferred light sources are advantageously constructed as LEDs. The two outer LEDs 5' are aligned in one direction 9, 9' so that their light is coupled on the front side into the optical waveguides 2, 3. As a result of the prism arrangement 10 of these optical waveguide arms 2, 3, the largest portion of the coupled-in light is coupled out in a preferred direction 11, which is the main emission direction of the optical waveguide arrangement 1. The coupled-in light is coupled out after a multiple reflection, as a diffuse emission from a light exit surface 7. The light exit surface 7 situated opposite the prism arrangement 10 is advantageously constructed as a smooth clear end surface that extends in one or more parts over the entire length 12 of the optical waveguide arrangement 1. A covering pane 16 may be disposed in front of the optical waveguide arrangement.

Several LEDs, which emit their light directly in the main emission direction 11, are bonded in the central area 4 of the carrier plate 6. In the emission direction 11, an optical element 8 is advantageously disposed in front of the carrier plate 6, the emission of the LEDs 5 radiating through the optical element 8. The optical element 8 may be constructed as an optical waveguide comparable with respect to its emission characteristic to the optical waveguide arms 2, 3, for example, as a prism plate, so that a homogeneous emission is achieved over the entire length 12 of the optical waveguide arrangement 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A light for motor vehicles, comprising a rod-shaped optical waveguide arrangement having at least two optical waveguide arms which are arranged behind one another in their longitudinal direction, wherein in a central area between the optical waveguide arms, a row of more than two light sources aligned in a longitudinal direction of the optical waveguide arrangement is arranged on an electronic carrier plate, such that light of two outer light sources is coupled into respective front sides of the optical waveguide arms and emitted transversely to their longitudinal direction by way of a light exit surface situated opposite a reflecting surface, and light of at least one light source situated in-between the two outer light sources is emitted directly in a direction perpendicular to the light exit surface.

2. The light according to claim 1, wherein an optical element is disposed in front of the electronic carrier plate in the direction of the light exit surface.

3. The light according to claim 2, wherein the optical element disposed in front is constructed as an optical waveguide.

4. The light according to claim 1, wherein the electronic carrier plate is constructed as a flexible printed circuit board.

5. The light according to claim 1, wherein the light sources are constructed as light-emitting diodes.

6. The light according to claim 1, wherein the outer light sources and the inner light sources have different light intensities.

7. The light according to claim 1, wherein the optical waveguide arrangement is constructed in one piece.

8. The light according to claim 1, wherein the carrier plate is constructed as a plastic insert.

9. The light according to claim 1, wherein the optical waveguide arrangement has a modular design, such that individual modules are detachably connected with one another by way of snap-in and/or plug-type connections.

10. The light according to claim 1, wherein the optical waveguide arrangement has three or more optical waveguide arms, each having carrier plates arranged in-between, said carrier plates each carrying a plurality of light sources, such that the light of the respectively outer light sources can be coupled into the respectively adjacent faces of the corresponding optical wave guide arms.

11. The light according to claim 1, wherein the light is an additional brake light.

12. The light according to claim 8, wherein the plastic insert is an injection-molded part.

* * * * *